(12) United States Patent
Kuroishi et al.

(10) Patent No.: US 9,809,180 B2
(45) Date of Patent: Nov. 7, 2017

(54) ELECTRIC WIRE SHEATHING MEMBER AND WIRE HARNESS

(71) Applicant: Sumitomo Wiring Systems, Ltd., Yokkaichi, Mie (JP)

(72) Inventors: Ryo Kuroishi, Mie (JP); Hirokazu Nakai, Mie (JP)

(73) Assignee: SUMITOMO WIRING SYSTEMS, LTD., Yokkaichi, Mie (JP)

(*) Notice: Subject to any disclaimer, the term of this patent is extended or adjusted under 35 U.S.C. 154(b) by 0 days.

(21) Appl. No.: 15/359,815

(22) Filed: Nov. 23, 2016

(65) Prior Publication Data

US 2017/0144615 A1     May 25, 2017

(30) Foreign Application Priority Data

Nov. 25, 2015  (JP) ................. 2015-229555

(51) Int. Cl.
*H02G 3/04*  (2006.01)
*B60R 16/02*  (2006.01)
*H01B 7/00*  (2006.01)

(52) U.S. Cl.
CPC ....... *B60R 16/0215* (2013.01); *H01B 7/0045* (2013.01); *H02G 3/0481* (2013.01)

(58) Field of Classification Search
CPC ............ B60R 16/0215; B60R 16/0207; B60R 16/00; H01B 7/0045; H01B 7/00; H01B 7/0009; H01B 7/0081; H01B 7/04; H02G 3/0481; H02G 3/00; H02G 3/02; H02G 3/06

USPC ....... 174/68.1, 68.3, 72 A, 73.1, 74 R, 88 R, 174/70 C, 79; 248/68.1, 49
See application file for complete search history.

(56) References Cited

U.S. PATENT DOCUMENTS

| | | | | |
|---|---|---|---|---|
| 5,095,176 | A * | 3/1992 | Harbrecht | H01B 7/285 174/70 A |
| 6,933,438 | B1 * | 8/2005 | Watts | H02G 3/0468 174/68.1 |
| 8,280,209 | B2 * | 10/2012 | Bollinger, Jr. | G02B 6/4459 385/106 |
| 8,420,936 | B2 * | 4/2013 | Huang | H02G 3/0481 174/74 R |
| 8,649,644 | B2 * | 2/2014 | Greenwood, III | G02B 6/4433 385/107 |
| 8,872,033 | B2 * | 10/2014 | Oka | H01B 7/225 174/110 R |
| 9,566,918 | B2 * | 2/2017 | Wakabayashi | B60R 16/0215 |

(Continued)

FOREIGN PATENT DOCUMENTS

JP         2015106466 A     6/2015

*Primary Examiner* — Angel R Estrada
(74) *Attorney, Agent, or Firm* — Reising Ethington, P.C.

(57) ABSTRACT

An electric wire sheathing member including a resin pipe with which springback can be suppressed, and a wire harness are provided. The electric wire sheathing member includes a resin pipe that has a tubular shape into which an electric wire can be inserted and that is bent into a predetermined shape, and a metal body that is integrally provided in at least a bent portion of the resin pipe and continuously extends in the axial direction. With this configuration, the rigidity of a bent portion of the resin pipe is increased by the metal body, thus making it possible to suppress the springback of the resin pipe.

6 Claims, 6 Drawing Sheets

(56) References Cited

U.S. PATENT DOCUMENTS 9,640,957 B2 * 5/2017 Inao ................... B60R 16/0215
2016/0295755 A1 10/2016 Lee

* cited by examiner

ELECTRIC WIRE SHEATHING MEMBER AND WIRE HARNESS

This application claims the benefit of Japanese Application No. JP2015-229555, filed on Nov. 25, 2015, the contents of which are hereby incorporated by reference in their entirety.

FIELD

The present invention relates to an electric wire sheathing member and a wire harness.

BACKGROUND

Conventionally, it has been known that electric wires included in wire harnesses to be arranged underneath the floor of a vehicle and the like are inserted into electric wire sheathing members having a tubular shape so as to be protected. For example, in the wire harness disclosed in JP 2015-106466A mentioned below, a metal pipe is used as the electric wire sheathing member so as to also hold the wiring path of electric wires. The metal pipe is bent into a predetermined shape using a pipe bender.

There has been demand to use a resin pipe instead of the above-mentioned metal pipe in order to reduce the weight of a vehicle. However, there has been a problem in that even when a resin pipe is bent using a pipe bender, a phenomenon (springback) in which a bent portion slightly returns to the original state is likely to occur when the resin pipe is removed from the pipe bender.

The present design was made based on the foregoing circumstances, and it is an object thereof to provide an electric wire sheathing member including a resin pipe with which springback can be suppressed, and a wire harness.

SUMMARY

An electric wire sheathing member according to the present design includes a resin pipe that has a tubular shape into which an electric wire can be inserted and that is bent into a predetermined shape, and a metal body that is integrally provided in at least a bent portion of the resin pipe and continuously extends in an axial direction.

A wire harness according to the present design includes the aforementioned electric wire sheathing member.

With the present invention, the rigidity of the bent portion of the resin pipe is increased by the metal body, thus making it possible to suppress the springback of the resin pipe.

DESCRIPTION

Hereinafter, preferred embodiments will be described.

In an electric wire sheathing member, the above-mentioned metal body may be a rod-shaped member that extends substantially in parallel with the axial direction of the above-mentioned resin pipe. With this configuration, the rigidity of the bent portion of the resin pipe can be easily adjusted by increasing or reducing the number of metal bodies, thus making it possible to use an appropriate number of metal bodies and reduce cost.

Also, in the electric wire sheathing member, the above-mentioned metal body may be a spiral member that progressively extends in the axial direction of the above-mentioned resin pipe while turning in the circumferential direction of the resin pipe. With this configuration, when the resin pipe is molded, the metal body can be more easily set in a metal mold as compared with the case where a plurality of rod-shaped members are set in the metal mold, for example, thus making it easy to manufacture the resin pipe.

The electric wire sheathing member may also include a braided wire that is formed in a tubular shape using a plurality of metal strands and that covers the above-mentioned electric wire and is arranged inside the above-mentioned resin pipe, or that covers the resin pipe and is arranged outside the resin pipe.

With this configuration, the electric wire is shielded by the braided wire over the entire length. Here, in the case where the portion of the electric wire that is inserted into a metal pipe is shielded by the metal pipe and portions of the electric wire that project from the metal pipe are shielded by the braided wires in a conventional manner, connecting parts for connecting the braided wires to the end portions of the metal pipe are needed. However, with the above-mentioned configuration, there is no need to connect the pipe and the braided wire, thus making it possible to reduce the number of parts.

Embodiment 1

Hereinafter, an embodiment will be described in detail with reference to FIGS. 1 to 4.

Figure 1:
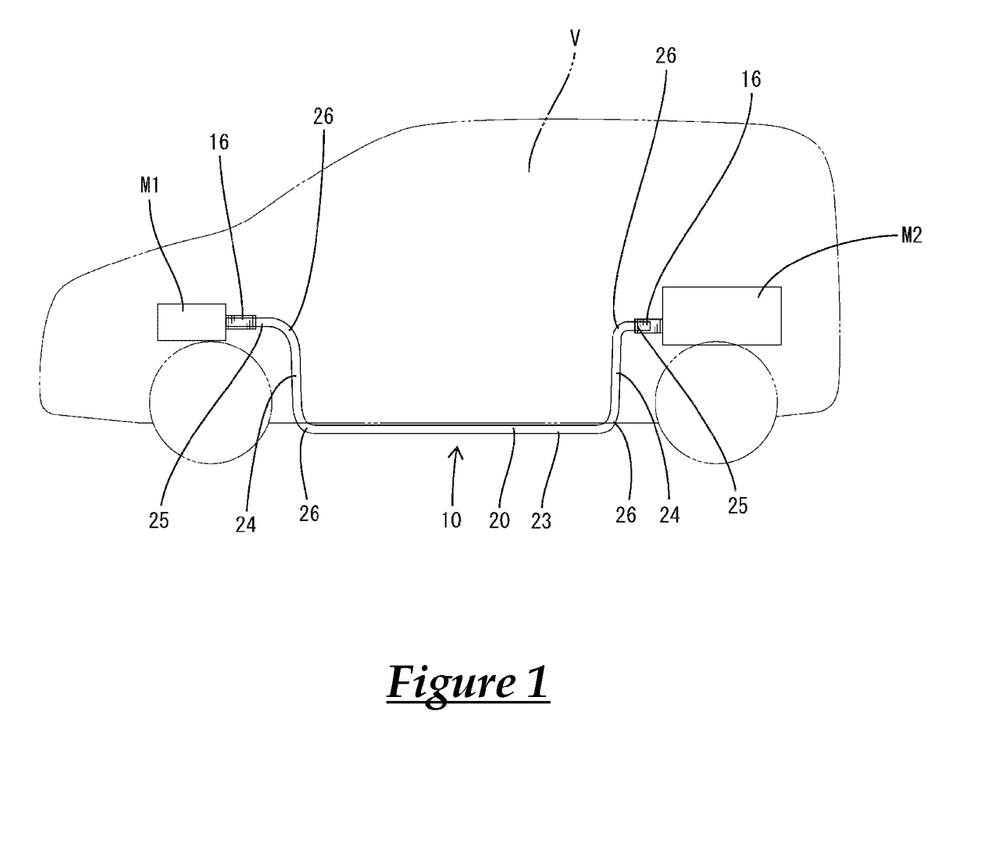
FIG. 1 is a schematic view illustrating a state in which a wire harness including an electric wire sheathing member according to Embodiment 1 is attached to a vehicle.

A wire harness 10 of this embodiment is to be attached to a vehicle V such as an electric car or a hybrid car. As shown in FIG. 1, the wire harness 10 connects a device M1 arranged in an engine room in the front portion of the vehicle V and a device M2 arranged in a compartment in the rear portion of the vehicle V, and is routed from the front side of the interior of the vehicle V to the rear side of the interior of the vehicle V, passing underneath the floor of the vehicle body, that is, outside the vehicle body frame.

Figure 3:
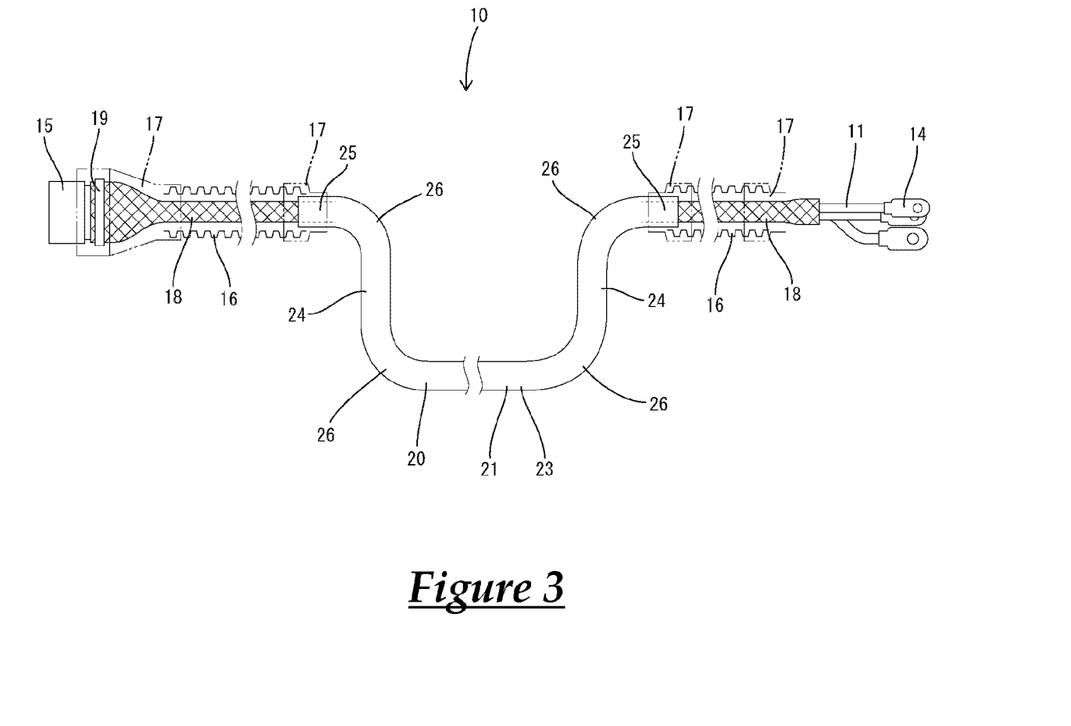
FIG. 3 is a side view showing the wire harness including the electric wire sheathing member.
Figure 4:
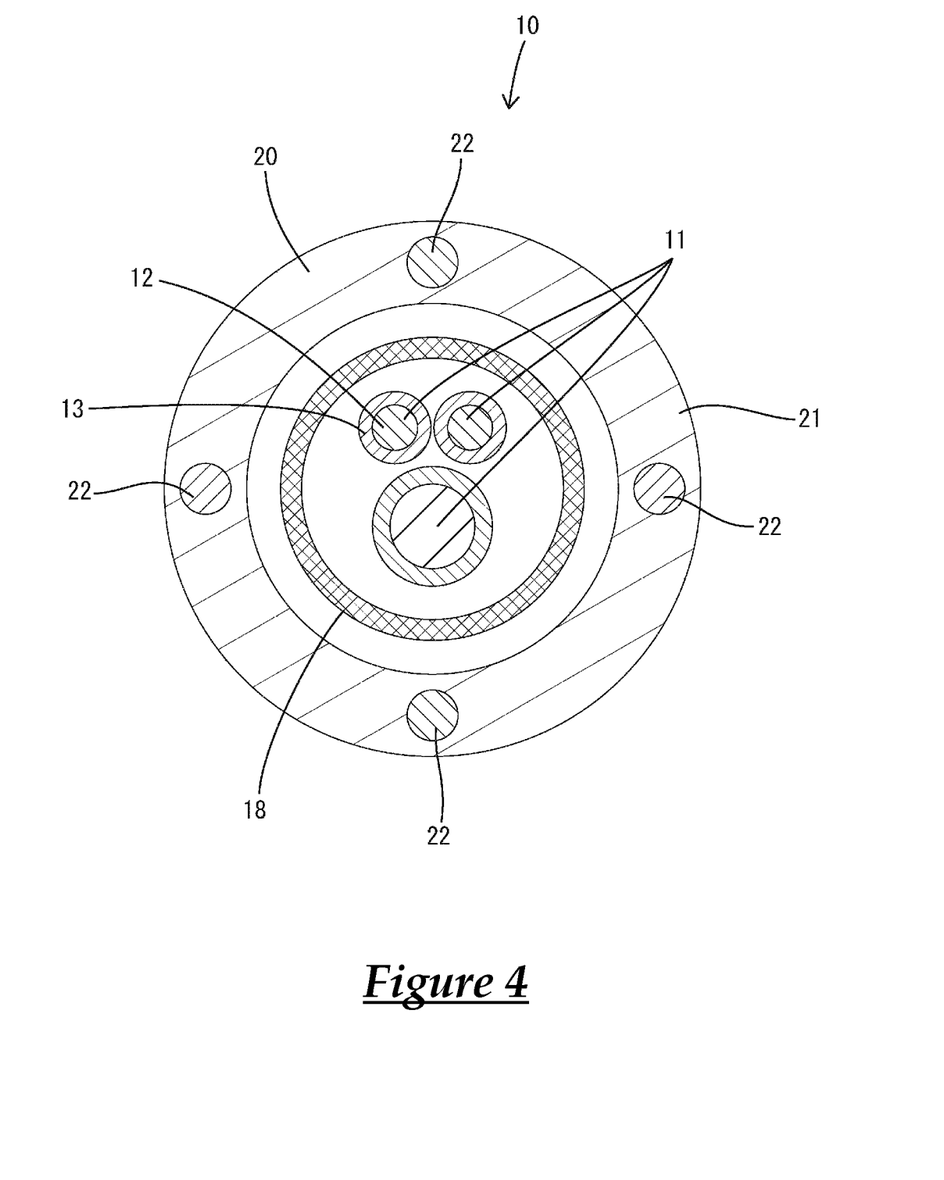
FIG. 4 is a cross-sectional view showing the wire harness including the electric wire sheathing member.

The wire harness 10 includes a plurality of (three in this embodiment) electric wires 11 (see FIGS. 3 and 4). The electric wires 11 are not provided with a shielding function, and are obtained by covering a conductor 12 with an insulating coating 13. Terminal fittings 14 or a connector 15 that can be connected to the devices M1 and M2 are connected to the end portions of the electric wires 11.

The wire harness 10 includes an electric wire sheathing member 20 for protecting the electric wires 11 that have been inserted into the electric wire sheathing member 20. The electric wire sheathing member 20 covers the electric wires 11 of the wire harness 10 all together.

The electric wire sheathing member 20 includes a resin pipe (referred to as "pipe 21" hereinafter) having a tubular shape into which the electric wires 11 can be inserted, and metal bodies 22 that are integrally provided in the pipe 21.

Figure 2:
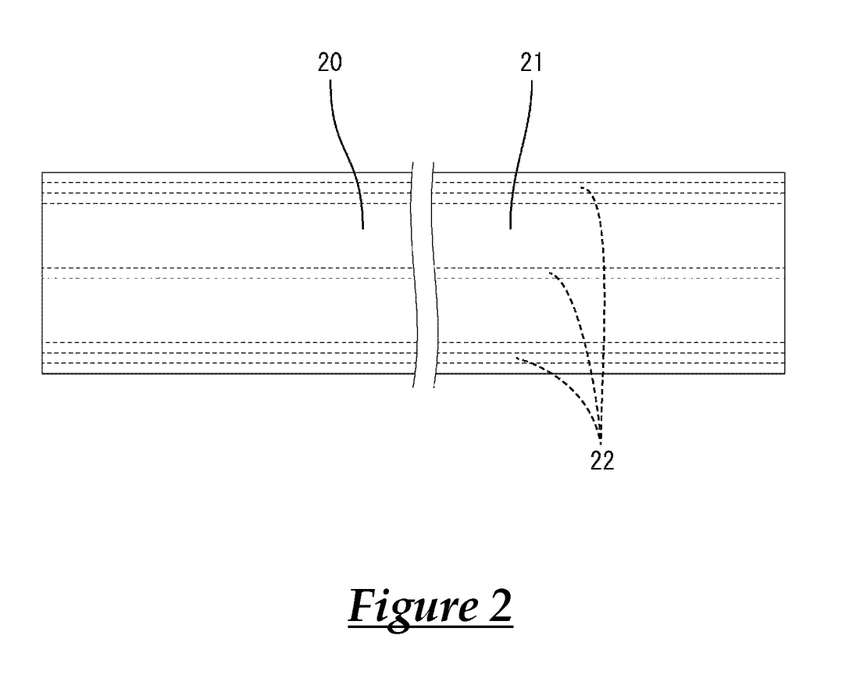
FIG. 2 is a side view showing the electric wire sheathing member.

The pipe 21 has an elongated cylindrical shape that has a substantially circular cross section and is open toward the two sides in the axial direction. The thickness dimension (wall thickness dimension in the inside-outside direction) of the pipe 21 is constant over the entire length and the entire circumference. The pipe 21 is shaped as a straight pipe whose cross-sectional shape is constant (cross-sectional shape does not change) over the entire length.

The pipe 21 is bent into a predetermined shape in order to follow the wiring path of the wire harness 10 in the vehicle V. In this embodiment, most of the pipe 21 is a horizontal portion 23 that is to be substantially horizontally arranged extending underneath the floor of the vehicle V. First intersecting portions 24 obtained by bending the pipe 21 in a direction intersecting the horizontal portion 23, and second intersecting portions 25 obtained by bending the pipe 21 in a direction intersecting the first intersecting portions 24 are provided at the two end portions of the pipe 21. The first intersecting portions 24 are obtained by bending the pipe 21 at a substantially right angle to the horizontal portion 23, and the second intersecting portions 25 are obtained by bending the pipe 21 at a substantially right angle to the first intersecting portions 24. At the two end portions of the pipe 21, the first intersecting portions 24 are bent in the same direction, and the second intersecting portions 25 are bent in opposite directions.

In the pipe 21, the portions between the horizontal portion 23 and the respective first intersecting portions 24, and the portions between the first intersecting portions 24 and the second intersecting portions 25 are portions that have been bent (referred to as "bent portions 26" hereinafter). The bent portions 26 are bent at a substantially right angle.

In the state in which the wire harness 10 is attached to the vehicle V, the entirety of the horizontal portion 23 is arranged underneath the floor, and the upper end portions of the first intersecting portions 24 and the entirety of the second intersecting portions 25 are arranged in the interior of the vehicle V. That is, the first intersecting portions 24 are arranged extending from the exterior of the vehicle V to the interior thereof. The two ends of the pipe 21 (the tips of the second intersecting portions 25) are respectively arranged near the devices M1 and M2. The pipe 21 is fixed to the body of the vehicle V as appropriate using an attachment tool (not shown). It should be noted that the pipe 21 is also bent in the left-right direction of the vehicle V in the state in which the pipe 21 is attached to the vehicle V, although this is not shown in the diagrams.

As shown in FIG. 3, the two end portions of the pipe 21 are provided with protecting parts 16 for protecting portions of the electric wire 11 and a later-described braided wire 18 that are arranged between the pipe 21 and the devices M1 and M2. Bendable parts (e.g., corrugated tubes) are used as the protecting parts 16 in order to easily connect the wire harness 10 to the devices M1 and M2. Connection portions where the protecting members and the pipe 21 are connected to each other are made waterproof using waterproofing parts 17 including a rubber member, such as a grommet.

The metal body 22 is a rod-shaped member that continuously extends substantially in parallel with the axial direction of the pipe 21. In this embodiment, as shown in FIG. 4, four metal bodies 22 are provided. The four metal bodies 22 are arranged at the upper portion, lower portion, left portion, and right portion of the pipe 21 (at positions that equally divide the circumference of the pipe 21).

The metal bodies 22 are each an elongated metal rod having a circular cross section. The four metal bodies 22 have the same properties (they are made of the same metal material and have the same diameter dimension and the same length dimension). The diameter dimension of the metal body 22 is smaller than the wall thickness dimension of the pipe 21, and the metal bodies 22 are entirely embedded in the wall of the pipe 21. The length dimension of the metal bodies 22 is the same as the length dimension of the pipe 21, and the metal bodies 22 are arranged over the entire length of the pipe 21.

The wire harness 10 includes the braided wire 18 that is formed in a tubular shape using metal strands. The braided wire 18 has flexibility and thus can be freely bent. As shown in FIG. 4, the braided wire 18 covers the three electric wires 11 all together and is arranged inside the pipe 21. The braided wire 18 is long enough to cover the electric wires 11 over the entire length, extends outward from the two ends of the pipe 21, and reaches the devices M1 and M2. The end portions of the braided wire 18 are connected to the devices M1 and M2 using connecting members 19 such as crimp rings. Thus, the electric wires 11 are shielded over the entire length.

Next, an example of operations for manufacturing the wire harness 10 of this embodiment will be described.

First, the pipe 21 is molded. All the metal bodies 22 are set in a metal mold, and then a resin is poured into the metal mold to form the pipe 21 by insert molding. Thus, the pipe 21 having a straight shape as a whole is manufactured.

Then, the braided wire 18 and the electric wires 11 are inserted into the pipe 21. The end portions of the electric wires 11 and the braided wire 18 project outward from the two end portions of the pipe 21.

Next, the pipe 21 is subjected to bending processing. The pipe 21 is bent using a pipe bender so as to have a shape corresponding to the vehicle V. Since the rigidity of the bent portions 26 of the pipe 21 is increased by the metal bodies 22, springback is suppressed, and thus the shape of the pipe 21 is retained in the state in which the bent portions 26 are bent at a predetermined angle.

Thereafter, the protecting parts 16, the waterproofing parts 17, or the like are connected to the two end portions of the pipe 21 as appropriate.

Accordingly, the operations for manufacturing the wire harness 10 including the electric wire sheathing member 20 are complete.

Next, the functions and effects of the embodiment configured as mentioned above will be described.

The electric wire sheathing member 20 of this embodiment includes the resin pipe 21 that has a tubular shape into which the electric wires 11 can be inserted and that is bent into a predetermined shape, and the metal bodies 22 that are integrally provided in the resin pipe 21 and continuously extend in the axial direction.

With this configuration, the rigidity of the bent portions 26 of the resin pipe 21 is increased by the metal bodies 22, thus making it possible to suppress the springback of the resin pipe 21. In addition, since the resin pipe 21 is used instead of a metal pipe 21, there is no need to provide parts such as a pipe end holder for preventing the electric wires 11 from being damaged due to contact with the end surface of the pipe 21, thus making it possible to reduce the number of parts.

The metal body 22 is a rod-shaped member that extends substantially in parallel with the axial direction of the pipe 21. With this configuration, the rigidity of the bent portions 26 of the resin pipe 21 can be easily adjusted by increasing or reducing the number of metal bodies 22, thus making it possible to use an appropriate number of metal bodies 22 and reduce cost.

In addition, the wire harness 10 includes the braided wire 18 that is formed in a tubular shape using a plurality of metal strands and that covers the electric wires 11 and is arranged inside the resin pipe 21. With this configuration, the electric wires 11 are shielded by the braided wire 18 over the entire length. Here, in the case where portions of electric wires that are inserted into a metal pipe are shielded by the metal pipe and portions of the electric wires that project from the metal pipe are shielded by braided wires in a conventional manner, connecting parts for connecting the braided wires to the end portions of the metal pipe are needed. However, with the above-mentioned configuration, there is no need to connect the pipe 21 and the braided wire 18, thus making it possible to reduce the number of parts. Furthermore, since the braided wire 18 is arranged inside the pipe 21, the need for a protecting part (part that covers the outside of the braided wire 18) for protecting the braided wire 18 can be eliminated.

Embodiment 2

Figure 5:
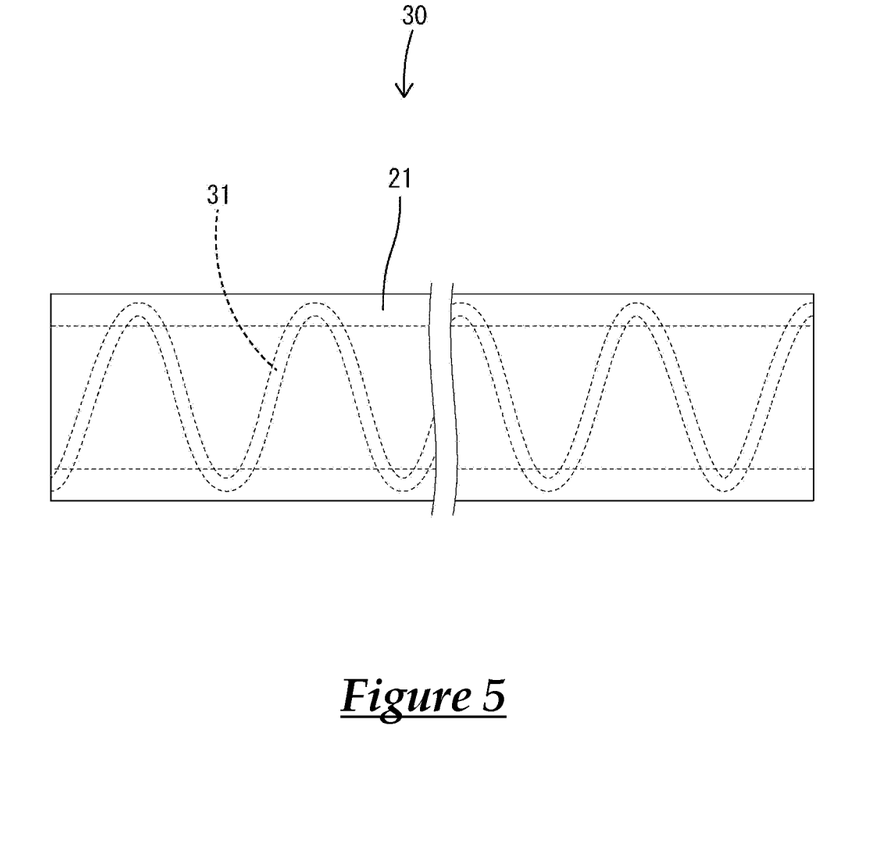
FIG. 5 is a side view showing an electric wire sheathing member according to Embodiment 2.
Figure 6:
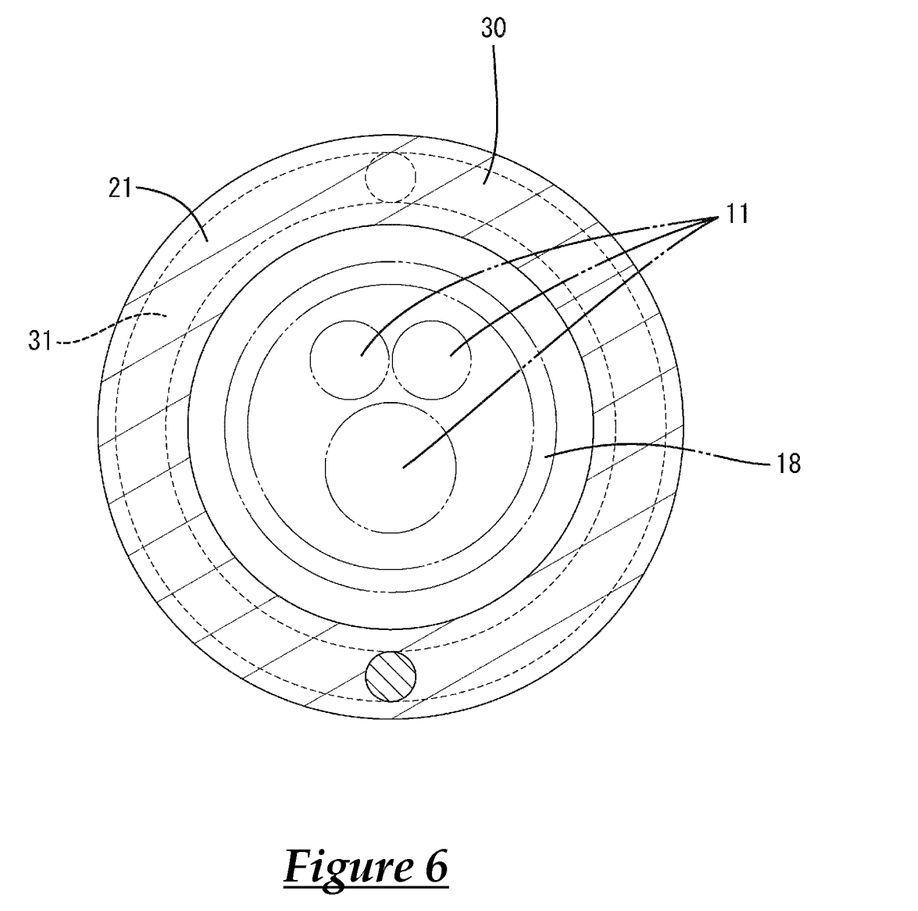
FIG. 6 is a cross-sectional view showing the electric wire sheathing member.

Next, an electric wire sheathing member 30 according to Embodiment 2 will be described with reference to FIGS. 5 and 6.

The electric wire sheathing member 30 of this embodiment differs from that of Embodiment 1 in that a metal body 31 is a spiral member that progressively extends in the axial direction of the pipe 21 while turning in the circumferential direction of the pipe 21. It should be noted that configurations similar to those in Embodiment 1 are denoted by the same reference numerals as in Embodiment 1, and redundant descriptions are omitted.

Similarly to Embodiment 1, the electric wire sheathing member 30 of this embodiment includes the resin pipe 21 that has a tubular shape into which the electric wires 11 can be inserted and that is bent into a predetermined shape.

The metal body 31 is obtained by winding a metal wire material in a spiral shape. The metal body 31 is wound with a constant pitch over the entirety thereof. The diameter dimension of the metal wire material is smaller than the thickness dimension of the pipe 21, and the metal body 21 is entirely embedded in the wall of the pipe 21. Similarly to Embodiment 1, the length dimension of the metal body 31 is the same as the length dimension of the pipe 21, and the metal body 31 is arranged over the entire length of the pipe 21.

The wire harness 10 including the electric wire sheathing member 30 is manufactured by setting the metal body 31 in a metal mold, forming the pipe 21 by insert molding, inserting the braided wire 18 and the electric wires 11 into the pipe 21, and then bending the pipe 21, in the same manner as in Embodiment 1. At the bent portions 26 of the pipe 21, the winding pitch of the metal body 31 decreases on the inner side of the bending, and the winding pitch of the metal body 31 increases on the outer side of the bending.

As described above, in this embodiment, similarly to Embodiment 1, the rigidity of the bent portions 26 of the resin pipe 21 is increased by the metal body 31, thus making it possible to suppress the springback of the resin pipe 21. In addition, the metal body 31 is a spiral member that progressively extends in the axial direction of the pipe 21 while turning in the circumferential direction of the pipe 21. Therefore, when the pipe 21 is molded, the metal body 31 can be more easily set in a metal mold as compared with the case where a plurality of metal rods are set in the metal mold, for example, thus making it easy to manufacture the resin pipe 21.

Other Embodiments

The present invention is not limited to the embodiments above, which have been described using the foregoing descriptions and the drawings, and, for example, embodiments as described below are also encompassed within the technical scope of the present invention.

Although the metal bodies 22 (31) are entirely embedded in the wall of the pipe 21 in the above embodiments, there is no limitation to this, and the metal bodies may be exposed from the outer circumferential surface or the inner circumferential surface.

Although the wire harness 10 includes the braided wire 18 in the above embodiments, the braided wire is not necessarily required to be provided.

Although the metal bodies 22 (31) are arranged over the entire length of the pipe 21 in the above embodiments, there is no limitation to this, and the metal bodies may be arranged in only the bent portions of the pipe, for example.

Although the braided wire 18 is arranged inside the pipe 21 in the above embodiments, there is no limitation to this, and the braided wire may be arranged outside the pipe.

Although the electric wires 11 having no shielding function are inserted into the pipe 21 in the above embodiments, there is no limitation to this, and electric wires having a shielding function may be inserted therein.

Although the braided wire 18 covers all the electric wires 11 together inside the pipe 21 in the above embodiments, there is no limitation to this, and the braided wire may cover only some of the electric wires inside the pipe.

Although a specific example of the shape of the pipe 21 is shown in the above embodiments, there is no limitation to this, and the bent positions of the pipe, the number of bent positions, and the bending angles at the bent portions can be changed as desired.

Although the case where the metal bodies 22 (31) are each a rod-shaped member or a spiral member is shown as an example in the above embodiments, the shape of the metal body can be changed as desired, and the metal body may be a plate member that has a slight width in the short direction and is continuous in the axial direction of the pipe, or the like, for example.

Although four metal bodies 22 are provided in Embodiment 1 described above, there is no limitation to this, and the number of metal bodies can be changed as desired depending on the rigidity required in the pipe. For example, one metal body may be used, or two, three, or five or more metal bodies may be used.

Although the plurality of metal bodies 22 are arranged at positions that equally divide the circumference of the pipe 21 in Embodiment 1 described above, there is no limitation to this, and the positions at which the metal bodies are arranged can be changed as desired. For example, a plurality of metal bodies may be arranged to be shifted toward a certain portion in the circumferential direction.

Although the four metal bodies 22 have the same properties in Embodiment 1 described above, there is no limitation to this, and a plurality of metal bodies may be made of different materials and may have different diameter dimensions and length dimensions.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electric wire sheathing member, comprising:
   a resin pipe that has a tubular shape into which an electric wire can be inserted and that is bent into a predetermined shape; and
   a metal body that is integrally provided in at least a bent portion of the resin pipe and continuously extends in an axial direction, wherein the metal body is a spiral member that progressively extends in the axial direction of the resin pipe while turning in a circumferential direction of the resin pipe.

2. A wire harness comprising the electric wire sheathing member according to claim 1.

3. An electric wire sheathing member, comprising:
   a resin pipe that has a tubular shape into which an electric wire can be inserted and that is bent into a predetermined shape;
   a metal body that is integrally provided in at least a bent portion of the resin pipe and continuously extends in an axial direction; and
   a braided wire that is formed in a tubular shape using a plurality of metal strands and that covers the electric wire and is arranged inside the resin pipe, or that covers the resin pipe and is arranged outside the resin pipe.

4. The electric wire sheathing member according to claim 3, wherein the metal body is a rod-shaped member that extends substantially in parallel with the axial direction of the resin pipe.

5. A wire harness comprising the electric wire sheathing member according to claim 4.

6. A wire harness comprising the electric wire sheathing member according to claim 3.

* * * * *